Oct. 20, 1959
HANS-BERNHARD SCHUENEMANN ET AL 2,909,070
RECIPROCATING CARRIAGE DRIVE
Filed May 14, 1958
3 Sheets-Sheet 1

INVENTORS
**HANS-BERNHARD SCHUENEMANN
THEO SCHWABACH**

BY *Beall & Jones*

ATTORNEYS

Oct. 20, 1959 HANS-BERNHARD SCHUENEMANN ET AL 2,909,070
RECIPROCATING CARRIAGE DRIVE
Filed May 14, 1958 3 Sheets-Sheet 2

INVENTORS
**HANS-BERNHARD SCHUENEMANN
THEO SCHWABACH**

BY Beall & Jones

ATTORNEYS

Oct. 20, 1959
HANS-BERNHARD SCHUENEMANN ET AL
2,909,070
RECIPROCATING CARRIAGE DRIVE
Filed May 14, 1958
3 Sheets-Sheet 3

INVENTORS
HANS-BERNHARD SCHUENEMANN
THEO SCHWABACH
BY Beale & Jones
ATTORNEYS

United States Patent Office 2,909,070
Patented Oct. 20, 1959

2,909,070

RECIPROCATING CARRIAGE DRIVE

Hans-Bernhard Schuenemann, Veitschochheim, near Wuerzburg, and Theo Schwabach, Wuerzburg, Germany, assignors to Schnellpressenfabrik Koenig & Bauer Aktiengesellschaft, Wuerzburg, Germany, a corporation of Germany Application May 14, 1958, Serial No. 735,259

Claims priority, application Germany November 19, 1957

8 Claims. (Cl. 74—27)

This invention relates to a reciprocating carriage drive. More specifically, this invention relates to means for driving the reciprocating type bed of a cylinder printing press. Still more specifically, this invention relates to means for driving a reciprocating type bed of a printing press in which the means for conducting the reciprocating motion in either direction comprises a single type bed drive gear meshing with a rack on the underside of the bed, said gear being alternately driven by oppositely rotating intermediate gears positioned thereadjacent.

Reciprocating carriage drives for printing presses comprising a pair of oppositely rotating gears having segments alternately meshing with a drive gear to drive a reciprocating type bed are old in the art. The devices in the prior art, however, comprise appropriate rotary drives which are mounted at the side of the press frame, the motion from which is transmitted by heavy shaft means to the drive gear located centrally in the frame and meshing with a rack on the underside of the carriage. The disadvanatges concerned in such an arrangement are manyfold. Most salient is that the heavy stresses created in the driving, braking and reversing of the heavy carriage are conducted by the shaft to the outside of the frame. To equalize these, counter-stresses are naturally created in the press frame. The creation of such counter-stresses causes distortion and strain of the frame itself and violent wrenching throughout the entire frame which loosens the various parts and may utimately result in failure of the structure. To accommodate the strains thus created, designers of presses have had to make press frames of extremely heavy and rigid nature. Heavy bearings and sturdy heavy bases have been required. Indeed, the type bed carriage itself has been made heavy to withstand the shocks and strains created by the transmission of these forces to the outside of the press. By making the carriage of heavy weight, a vicious circle is created since more power, creating greater shocks and strains, is required to drive it.

Under the present invention, the driving means for moving the reciprocating carriage of the press is all located centrally of the press frame. Power of rotary nature having a single direction of rotation is directed into the frame and the means which is the subject of this invention acts directly on the press drive gear to effect rotary motion thereof which in turn imparts reciprocating motion to the carriage. Thus, there is no transmission to the outside of the frame of shocks and stresses arising from reversal of the drive shaft and no counter shocks and stresses created in the frame as with older devices. Consequently, the frame may be made of lighter material, the carriage may be lighter and require less power to drive it. Finally, the additional space needed for the reversing gear on one of the outside walls of the frame is no longer needed as space heretofore unused in the center of the frame is used for the reversing gear. Additionally, because of the reduction in power and weight of the structure, new higher speeds are possible for the carriage through our invention.

An object of this invention, therefore, is to provide in a printing press a carriage reversing means located centrally of the frame obviating the transmittal of reversing rotary forces from the outside of the frame inward and the shocks and stresses connected therewith.

A further object of this invention is to provide reciprocating carriage drive means which make possible strokes of differing durations forward and rearward.

This invention embodies other novel features, details of construction and arrangement of parts which are hereinafter set forth in the specification and claims, and illustrated in the accompanying drawings wherein:

Briefly, in a printing press having a frame bearing a reciprocating type bed carriage, a rack fixed on the underside of said bed, this invention is a carriage reversing means comprising a type bed drive gear unit including a hub mounted for oscillation in said frame under the bed. The hub carries a type bed carriage drive gear which meshes with the rack, and also carries a pair of sector gears on diametrically opposite sides thereof. The drive gear carries cam faces projecting outward from one radial face thereof, the other face mounting a freely rotatable follower wheel. A pair of intermediate drive gears are carried on shafts mounted for similar speed opposite rotation with respect to each other. Each intermediate drive gear accomplishes one rotation for each reciprocation of the bed. The shafts lie in the frame on opposite sides of said type bed carriage drive gear. Each of the intermediate drive gears carries on one radial face a pair of spaced drive rollers and carry on the opposite face a gear sector. The drive rollers are adapted to engage at predetermined time intervals the cam surfaces to effect reversal of the type bed drive gear, and the sector gears on the intermediate drive gears and on the type bed gear are adapted alternately to engage respectively to drive said drive gear in opposite directions. To appropriately relate the type bed drive gear during the period where the gear sectors are not in mesh, one of the intermediate drive gear shafts carried a blocking cam adapted to engage the follower wheel on the drive gear, in order to press the cam surfaces on the type bed drive gear unit against the engaging drive rollers.

Figure 1:
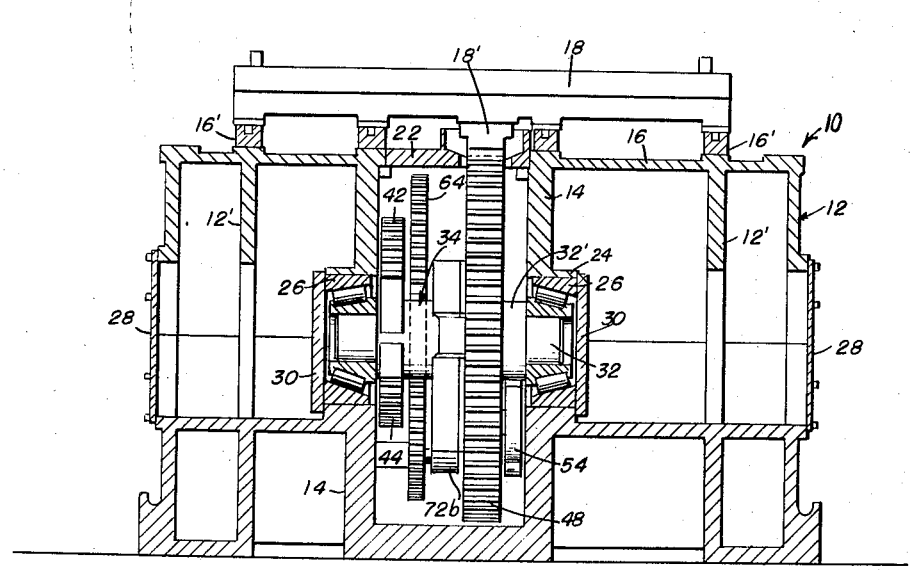
Fig. 1 is a modified sectional view taken on line 1—1 of Fig. 7.
Figure 5:
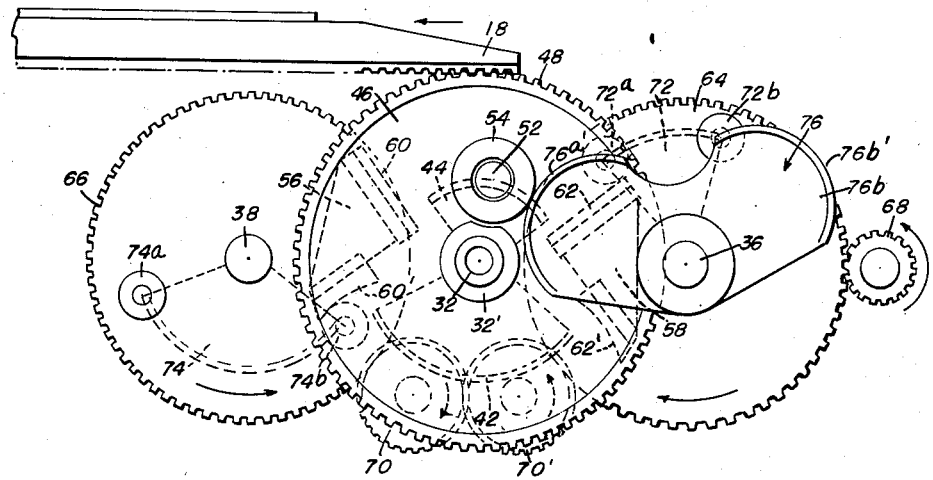
Fig. 5 is a sectional view partly schematic taken on line 5—5 of Fig. 1.
Figure 7:
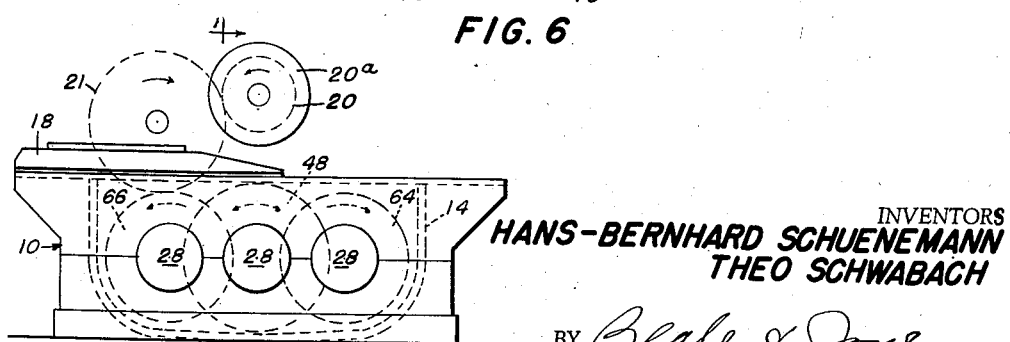
Fig. 7 is a reduced schematic side elevational view of a press according to the subject invention.

Referring more specifically to the drawings, a printing press incorporating the reciprocating carriage drive of our invention is broadly designated 10 in Fig. 1. It comprises a frame 12 as shown in section having a plurality of parallel longitudinally extending vertical walls 12′ with intersecting cross walls. Located centrally in the frame is a drive gear well 14. The well, as shown in Fig. 7, extends for a large portion of the length of the device. It serves as an oil-tight gear box. As shown, the frame and gear box are made in two major pieces, an upper half and a lower half. The two halves are joined by bolts or other means, in a plane which includes the center lines of the gear shafts. Thus, the upper half of the frame may be removed to expose the drive gearing for repair. While the gearing is thus exposed, the shafts thereof may be held down by suitable temporary means to enable rotation of the gears and even operation under inspection. The flat top surface 16 of the frame is provided with a plurality of raised longitudinally extending tracks 16' along which slide the carriage 18 bearing the type bed. The carriage 18 shown in its most leftward position in Fig. 5 is adapted to run the length of the tracks 16' and return to the position shown. In the center of the run, the bed underlies and engages an impression cylinder 20a shown schematically in Fig. 7 driven by appropriate gear means 21—20 linked with the carriage drive means and in synchronism therewith. The details of the impression cylinder drive means do not comprise part of this invention.

Figure 2:
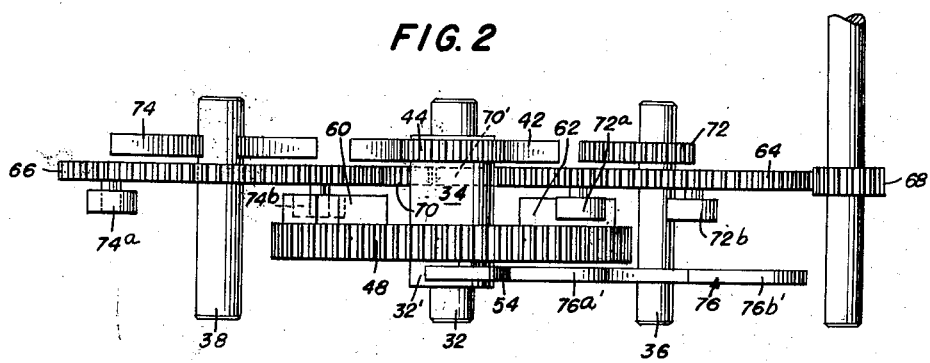
Fig. 2 is a plan view of the structure shown in Fig. 1 with much of the structure removed for clarity.

As shown in Fig. 1, the drive gear well 14 has thickened walls and is provided at its top with inwardly extending flanges which bear the well cover 22. A cutout area with upward extending guard permits protrusion of the gear. Especially thickened boss 24 areas are formed on the opposite longitudinal walls of the well. Each of these bosses—three on each wall in alignment—are bored out and receive in pressed fit, the outer race of a roller bearing unit 26. The other longitudinal walls of the frame are appropriately cut out to provide service means for the bearings and shafts. The cutouts on the outer walls receive cover plates 28 which protect from intrusion of dust and dirt. Similarly, the bearings themselves are provided with end plates 30. Each of the bearings 26 has an inner race which receives a shaft adapted to rotate in the bearings. The central shaft 32 (see Fig. 2) carries the type bed drive gear unit 34 while the outer two shafts 36 and 38 carry intermediate drive gears. Shafts 36 and 38 accomplish one rotation per reciprocating motion of the carriage.

Figure 3:
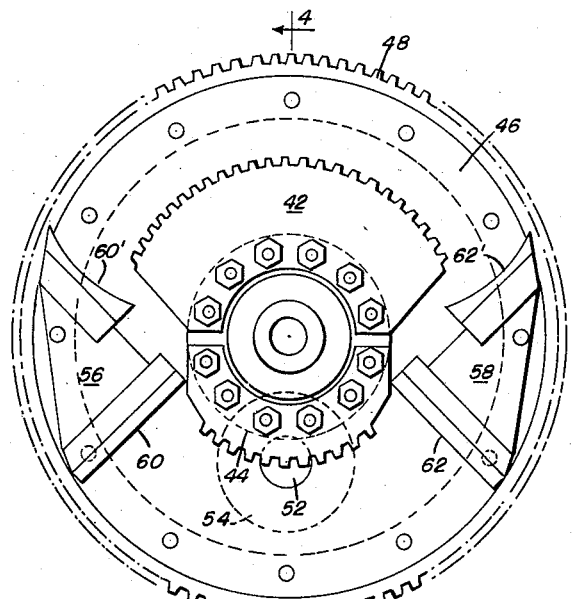
Fig. 3 is an enlarged end view of the type bed drive gear unit.
Figure 4:
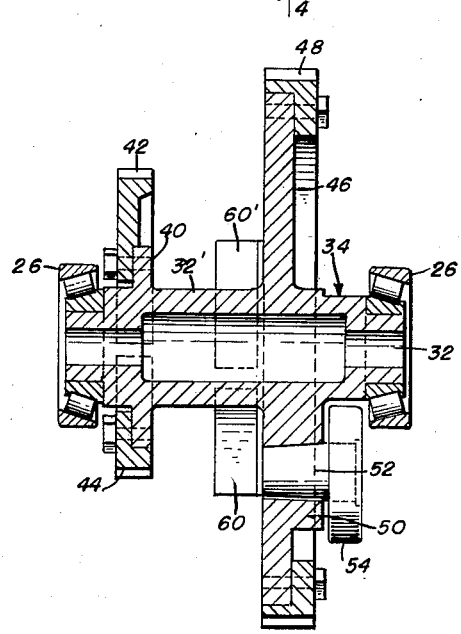
Fig. 4 is a sectional view taken on line 4—4 of Fig. 3.

Figs. 3 and 4 give a clear picture of the structure of the type bed drive gear unit 34. It comprises a hollow shaft 32 of lightweight construction materials and having an enlarged hub portion 32' with a central open core. At the enlargement on either side a shoulder is formed against which the inner race of one of the bearings 26 is pressed. Adjacent one end of the enlarged hub is an outwardly extending peripheral flange 40. This flange is appropriately drilled and tapped at regular intervals. Gear sectors 42 and 44 of different radii and arc, for reasons which will presently appear, are apertured and secured by bolts which engage the tapped holes in the flange 40. In the preferred form of the invention the larger sector 42 subtends an arc of about 125° while the smaller sector 44 subtends an arc of about 90°.

On the opposite side of the enlarged hub 32' from the flange 40 extends outwardly a disc 46 of considerably larger diameter than the flange. All about the outer margin of the disc 46 holes are drilled and tapped at regular intervals, and the periphery receives a gear ring 48 having an inwardly directed flange apertured and secured through these apertures by bolt means engaging the tapped holes. As can be seen in Fig. 4 for solidity, the ring gear 48 shoulders against the periphery of the disc 46. Alternatively, the disc can be formed with gear teeth to comprise a single unit. However, since the teeth wear and need to be replaced, it is a measure of economy to provide this removable ring. On the outer face of the disc an enlarged boss 50 is made and in the center thereof a tapered hole is formed. The tapered hole receives a stub axle 52 parallel to the axis of the hub 32'. Rotatably mounted on the axle is a cam follower wheel 54 having a smooth outer periphery.

On the opposite side of the disc from the wheel are secured a pair of diametrically opposed fittings 56 and 58. The fittings are relatively flat and triangular in shape and each have screwed thereto a pair of laterally extending cam faces 60, 60', 62 and 62'. The faces 60 and 62 are substantially flat and extend approximately radial with respect to the disc 46. The other faces 60' and 62' are concave in shape. Each face is made of hardened steel.

The type bed carriage drive gear 46—48 is of sufficient radius to extend upward through the cutout in the well cover 22. The underside of the carriage 18 carries a toothed rack 18' running its length. As shown, the teeth on the drive gear 46—48 mesh with the teeth of the rack 18' whereby, as the gear rotates, rectilinear motion is imparted to the carriage.

Journaled in the bearings on the opposite sides of the drive gear (see Fig. 2) unit are shafts 36 and 38 which mount intermediate gears 64 and 66. While the radii of gears 64, 66, and 46—48 may be equal, in the preferred embodiment of the invention the intermediate gears are of lesser radius than the drive gear 46—48. A drive pinion 68 imparts rotary motion to the intermediate gear 64. Towards the center of the frame additional gears 70 and 70' are mounted to convey the rotary motion of the intermediate gear 64 to the second intermediate gear 66. These additional gears 70 and 70' are on eccentric mountings so that their distance from the centers of the two intermediate gears 64 and 66 may be adjusted to prevent backlash which might result from wear or misposition. From Fig. 5 it can be seen that the two intermediate gears 64 and 66 are driven in contrary sense but at equal speed. Shafts 36 and 38 accomplish one rotation per forward and return stroke of the carriage.

Each shaft 36 and 38 mounts a gear sector 72 and 74 respectively; or, alternatively, a sector may be fastened to the radial face of the respective intermediate gears 64 and 66. The sectors 72 and 74 subtend different-sized arcs and are of different radii, being designed to mesh alternately respectively with the two gear sectors 42 and 44 on the drive gear unit hub 32'.

The difference in the radii of the sectors are to permit a slow printing stroke and a relatively faster return stroke of the carriage 18. Obviously, if it is desired to have the strokes of the same speed, the sectors may be of the same radius. On the opposite radial face of each intermediate gear 64 and 66 from the side of the sector gear 72 and 74 are rotatably mounted a pair of rollers 72a and b and 74a and b. The rollers are positioned approximately at the opposite ends of the sector gear on the opposite face of the intermediate gear, respectively. In other words the rollers flank the sector gears. The rollers are mounted on shafts similar to that of the follower wheel 54 and are freely rotatable. It is by means of these rollers and the cam faces 60, 61', 62 and 62' and the cooperation thereof that the slowing, stopping, and reversal of the drive gear unit 34 is effected. In the relation shown in Figs. 5 and 6 rollers 72b and 74b may be described as driving rollers while rollers 72a and 74a may be called retarding rollers.

Carried by the shaft 36 of one of the intermediate gears is blocking cam means 76. This means comprises a pair of lobes 76a and 76b mounted on a hub carried by the shaft. The lobes at their periphery have laterally extending flange members 76a' and 76b' which are adapted to successively engage the follower wheel 54. It is through the cooperation of the blocking cam means 76 and the follower wheel 54 that the improper relation of the three gears at the beginning and end of the cycles of motion of gear unit 34 when the sector gears do not engage, is avoided. More specifically, the blocking cam means engages the follower wheel 54 to impart a rotational moment to the type bed-drive gear unit 34 to ensure that the cam surfaces 60, 60', 62, and 62' on the unit are in firm engagement with the rollers 72a, 72b, 74a, and 74b during the entire duration of their function. Thus, one cam—the blocking cam 76—and one follower wheel 54 serve to ensure the proper functioning of all of the driving and retarding rollers and their cooperant cam surface.

Figure 6:
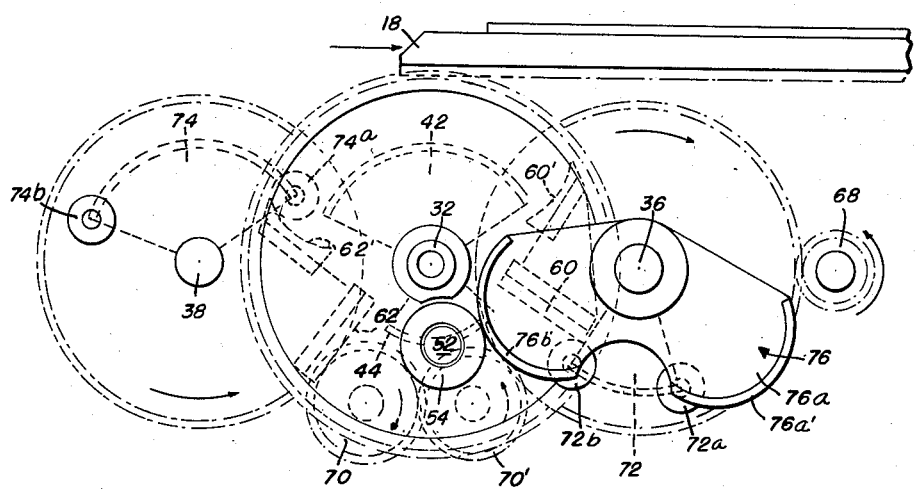
Fig. 6 is similar to Fig. 5 except that it shows the carriage in a different position.

As is designated in the drawings, Figs. 5 and 6, intermediate gears 64 and 66 each rotate consistently in one direction, the direction of the rotation of the two gears being opposite. With this in mind, the operation of the reciprocating drive means can be understood. Gear 66 drives and retards the unit 34 and carriage 18 during the printing or rightward stroke and gear 64 drives and retards the unit 34 during the return or leftward stroke. Fig. 5 shows the carriage 18 in the leftmost position. The retarding roller 72a on the clockwise rotating intermediate gear 64 is leaving the flat cam face 62 in the position shown in Fig. 5. Shortly before, the roller 72a had contacted the face 62 and gradually slowed down the counterclockwise rotation of the drive gear unit 34. Now, the drive roller 74b on the counterclockwise rotating intermediate gear 66 presses inward and upward against the concave face of the cam 60' to start the drive gear unit 34 on its clockwise movement. The contact of the drive roller 74b and the concave face 60' need only continue to a point where the sector gears 42 and 74 intermesh. Subsequently, the drive roller 74b does no longer engage face 60'. After the drive gear unit has been driven approximately 125° by the positive meshing of the sector gears 42 and 74 the sectors no longer engage. Shortly before this takes place the retarding roller 74a engages smoothly the concave face 62' and gradually brakes the clockwise rotation to a halt.

The motion arrested, (see Fig. 6) the retarding roller 74a on the counterclockwise rotating intermediate gear 66 leaves the concave face of the cam 62'. The carriage is here in the rightmost position shown in Fig. 6. Meanwhile, the drive roller 72b has engaged the flat face 60 and smoothly starts the drive gear unit 34 back in the counterclockwise direction. The driving roller 72b need only effect the turning on the drive gear unit 34 far enough so that the sectors 72 and 44 intermesh. The positive drive of the intermeshing takes over then. Finally, the position shown in Fig. 5 is once more reached when the retarding roller 72a, having engaged the flat face 62, has arrested the counterclockwise movement of the drive unit.

From the above-described operation, it can be seen that a smooth reciprocating drive is obtained. It will also be seen that the means on shafts 36 and 38 act directly on the means on hub 32 to effect the drive. There are no parts or means not carried on shafts 36 and 38 or on hub 32 by which the drive from the shafts 36 and 38 is effected. Compactness of the unit is thus maximized while likelihood of breakdown is minimized.

It will be noted that the cams 60, 60', 62 and 62' are open faced cams. To preclude the unit 34 getting in position where neither pairs of sectors intermesh and neither driving roller 72b or 74b is in driving engagement with its appropriate cam face 60 or 60', a cam blocking means 76 is provided on the intermediate drive shaft 36. Each lobe of the blocking cam means is appropriately shaped and the relation of the position of the blocking cam means is fixed on the shaft so that one of the flanges 76a' or 76b' in engagement with the follower wheel 54 on the unit can impart the necessary rotary force to the drive gear unit so that a driving roller will contact with its appropriate working cam face on the drive unit 34. The shape of the blocking cam also avoids the overrunning of the drive gear unit at the beginning of a stroke so that its position is too far advanced for the gear sectors to mismesh.

It should be understood that the shapes of the cam faces 60 60', 62 and 62' are determined by what configuration will best create a smooth reversal of the drive gear unit. It should also be noted that the size of the angle through which gear 46—48 oscillates is such that the gear 46—48 is of such size that the outer ends of the cams 60, 60', 62 and 62' farthest from the center of the gear 46—48 do not extend beyond the rim of said gear. Thus, in contrast to the devices of the prior art, there are no swinging cam arms extending beyond the rim of the gear to create interference and unnecessary hazards.

It may thus be seen that we have invented a compact arrangement for directly driving the drive gear of a reciprocating carriage type printing press. The applications of this foolproof device are not necessarily limited to printing presses, and it is felt that the mechanic skilled in the art will see many other applications.

While this invention has been shown in but one form, it is obvious to those skilled in the art that it is not so limited but is susceptible to various changes and modifications without departing from the spirit and scope of the claimed invention.

We claim:

1. A printing press having a frame bearing a reciprocating type bed carriage, a rack fixed to the underside of said carriage, a type bed carriage drive gear unit including a hub mounted for oscillation in said frame under said bed, said hub having a type bed carriage drive gear thereon meshing with said rack, said hub also carrying a pair of sector gears on diametrically opposite sides thereof, said type bed carriage drive gear carrying cam projections on one radial face thereof, a pair of intermediate drive gears carried respectively on a pair of shafts mounted for opposite rotation in said frame under said bed on diametrically opposite sides of said type bed carriage drive gear, means for rotating the intermediate drive gears in opposite directions respectively each of said intermediate drive gears carrying on the radial face on the same side a pair of spaced rollers and having on the opposite face a gear sector, said rollers being adapted to engage at predetermined time intervals one of said selected cam projections to effect retardation and reversal of said type bed carriage drive gear, said sector gears on said intermediate drive gears being adapted to engage alternately one of said sector gears on said type bed carriage drive gear unit to drive said type bed carriage drive gear in alternating directions whereby smooth reciprocating stroke motion of the type bed carriage is effected.

2. A printing press as described in claim 1 wherein the sector gears on said intermediate drive gear shafts are of different radii and the sector gears in the type bed press drive unit are respectively of complementary radii to enable meshing, and said cam projections are of different shape, whereby the reciprocation of the bed in one direction is more rapid than the reciprocation in the opposite direction.

3. A printing press as described in claim 1 wherein the ends of said cam projections farthest from the axis of the type bed carriage drive gear are closer to the axis of said type bed carriage drive gear than the rim of said type bed carriage drive gear.

4. A printing press as described in claim 1 wherein said shafts and said hub are mounted at the same height.

5. A printing press as described in claim 1 wherein the radial face of said type bed carriage drive gear opposite the radial face carrying the cam projections mounts a single freely rotatable follower wheel and one of said intermediate drive gear shafts mounts a blocking cam unit having cam surfaces adapted to engage at predetermined time intervals said follower wheel to urge continued motion at the end of each stroke and to retard motion at the beginning of each stroke, whereby the type bed drive gear unit is maintained in proper position when the sector gears are not in mesh.

6. A printing press as described in claim 1 wherein said rollers flank the sector gears on each respective intermediate gear.

7. A printing press as described in claim 1 wherein the means for rotating the intermediate drive gears in opposite directions respectively include additional gears, said additional gears being on eccentric shaft mounts to allow adjustment thereof to preclude backlash.

8. A printing press having a frame bearing a reciprocating type bed carriage, a rack fixed to the underside of said carriage, a type bed carriage drive gear unit including a hub mounted for oscillation in said frame under said bed, said hub having a type bed carriage drive gear thereon meshing with said rack, said hub also carrying a pair of sector gears on diametrically opposite sides thereof, said type bed carriage drive gear carrying cam projections on one radial face thereof, a pair of intermediate drive gears carried respectively on a pair of shafts mounted for opposite rotation in said frame under said bed, means for rotating said intermediate drive gears in opposite directions respectively, each of said intermediate drive gears carrying a pair of spaced rollers and a gear sector, said rollers being adapted to engage at predetermined time intervals one of said selected cam projections to effect retardation and reversal of said type bed carriage drive gear, said sector gears on said intermediate drive gears being adapted to engage alternately one of said sector gears on said type bed carriage drive gear unit to drive said type bed carriage drive gear in alternating directions whereby smooth reciprocating stroke motion of the type bed carriage is effected.

References Cited in the file of this patent

UNITED STATES PATENTS

| | | |
|---|---|---|
| 2,489,712 | Kelly | Nov. 29, 1949 |
| 2,659,237 | Wood | Nov. 17, 1953 |
| 2,660,066 | Kolland | Nov. 24, 1953 |